United States Patent [19]

Müller

[11] Patent Number: 4,940,565

[45] Date of Patent: Jul. 10, 1990

[54] METHOD FOR MANUFACTURING FRICTIONAL LOCKING RINGS FOR STEPPED MOTOR VEHICLE TRANSMISSION SYNCHRONIZING MECHANISMS

[75] Inventor: Erich R. Müller, Hohe Strasse 15, D-7110 Öhringen-Cappel, Fed. Rep. of Germany

[73] Assignee: Erich R. Mueller

[21] Appl. No.: 384,851

[22] Filed: Jul. 24, 1989

Related U.S. Application Data

[63] Continuation of Ser. No. 116,453, Nov. 3, 1987, abandoned.

[30] Foreign Application Priority Data

Nov. 3, 1986 [DE] Fed. Rep. of Germany ....... 3637385

[51] Int. Cl.⁵ ............................................. B22F 7/00
[52] U.S. Cl. ......................................... 419/8; 419/28; 419/2
[58] Field of Search ................... 419/9, 28, 2

[56] References Cited

U.S. PATENT DOCUMENTS

| | | | |
|---|---|---|---|
| 2,784,105 | 3/1957 | Stedman et al. | 106/36 |
| 3,037,860 | 6/1962 | Masterson et al. | 419/8 |
| 3,087,814 | 4/1963 | Smiley | 75/208 |
| 3,816,112 | 6/1974 | Heck | 419/8 |
| 4,576,872 | 3/1986 | Ward | 419/8 |
| 4,770,283 | 9/1988 | Pütz et al. | 419/8 |

FOREIGN PATENT DOCUMENTS

| | | |
|---|---|---|
| 3417813C1 | 5/1984 | Fed. Rep. of Germany . |
| 1570493 | 1/1968 | France . |
| 530904 | 12/1940 | United Kingdom . |

*Primary Examiner*—Stephen J. Lechert, Jr.

[57] ABSTRACT

A method serves for manufacturing frictional locking rings, in particular for stepped motor vehicle transmission synchronizing mechanisms, in which a sintered frictional coating is applied on a surface of the element and the sintered frictional coating is compacted.

For simplifying the method and improving the reproducibility of the dimensions of the surface of the sintered frictional coating one first applies a frictional coating of a sintering powder in a predetermined raw dimension regarding its thickness and compacts the frictional coating thereafter under pressure to a predetermined nominal dimension.

9 Claims, 3 Drawing Sheets

METHOD FOR MANUFACTURING FRICTIONAL LOCKING RINGS FOR STEPPED MOTOR VEHICLE TRANSMISSION SYNCHRONIZING MECHANISMS

This is a continuation of copending application Ser. No. 116,453, filed on Nov. 3, 1987, now abandoned.

The present invention relates to a method for manufacturing frictional locking rings for stepped motor vehicle transmission synchronizing mechanisms, in which the surface of a metallic base member is provided with a frictional coating made of a sintering powder and in which the frictional coating made of the sintering powder is compacted.

A method of this type has been known already from German Patent Specification No. 34 17 813.

According to the known method, a granular frictional material capable of being sintered is applied upon a plane carrier plate and sintered together with the latter in an oven. Thereafter, the plane carrier plate is compacted by one or more pressing operations.

Following the sintering and compacting processes, the carrier plate is cut into suitable sections, and the latter are given the desired shape of the frictional coating by deep-drawing. This shape may, for example, be a wave-like shape adapting itself to the outer surface of a conical body. The frictional body so formed is then applied to a metallic base member of the frictional locking member, for example a conical bore of a synchronizing ring, and fastened thereon, for example by welding. In the case of the before-mentioned wave-like shape, the frictional body may be spot-welded to the base member in the bulged areas adjoining the inner conical surface of the frictional locking ring.

However, the known method is connected with the disadvantage that following the sintering process a separate operation is required for compacting the frictional coating (the so-called calibration). In addition, the subsequent processing steps, in particular the forming of the frictional body consisting of the carrier plate and the frictional coating, may lead to dimensional deviations so that one has to put up with certain tolerances as regards the final dimensions of the frictional locking elements.

Now, it is the object of the present intention to improve a method and a device of the type described above so that the operational sequences are simplified and, in particular, that close-tolerance products are obtained.

The method mentioned at the outset achieves this object by the step of applying to the element a frictional coating made of a sintering powder of a predetermined raw density and compacting the frictional coating made of the sintering powder thereafter under pressure to a predetermined dimension.

The invention thus solves the problem underlying the invention fully and perfectly because calibrating the frictional coating consisting of the sintering powder directly on the finished element eliminates the separate steps of calibrating and subdividing the elements into different groups of dimensions, depending on the tolerances of the initial elements. The frictional coating is applied to the initial element directly, without any intermediate carrier plate or film. Calibration of the frictional coating may be effected directly on the element, even in the case of initial elements having different production tolerances, so that a uniform final dimension is ensured, irrespective of possible production tolerances of the initial elements.

According to a preferred embodiment of the method according to the invention, the frictional coating made of the sintering powder is compacted by means of the surface of a tool adapting itself to the sintered frictional coating in a form-locking manner.

This feature is particularly advantageous because it is anyway necessary to provide holding means for introducing the frictional body into the metallic base member of the frictional locking element so that this means may also be used for compacting the frictional coating in the desired manner. This eliminates one step in the manufacturing process, i.e. compacting (calibrating) the unit after sintering by compacting means to be provided especially for this purpose. In addition, compacting the frictional coating in the assembled condition directly on the frictional locking element provides the advantage that reproducible results are obtained because the frictional body need not be handled, in particular distorted, after the compacting process.

According to a first preferred embodiment of the method according to the invention the pressure is generated in the case of an inner conical surface by the axial introduction of a tool exhibiting an outer conical shape at least over certain portions thereof.

According to the invention, it is preferred to use for this purpose a device in which the element is provided with a sintered frictional coating with inner conical surface, in which the tool exhibits an outer conical surface having the same angle of taper, at least over certain portions thereof, and in which the element and the tool can be moved axially relative to each other and pressed together under pressure.

These features provide the advantage that particularly simple tools can be used. On principle, even the tools used heretofore may be employed, which were anyway required for introducing and holding the frictional body in the metallic base member of the frictional locking element, for fixing and holding the frictional body while it was welded on, for example.

According to a second embodiment of the method according to the invention, the pressure is generated in the case of an inner conical surface by spreading a tool having an outer conical shape, at least over certain portions thereof, after it has been applied to the inner conical surface.

It is preferred for this purpose to use a device in which the element is provided with a sintered frictional coating having an inner conical surface, and the tool exhibits an outer cone of identical angle of taper, at least over certain portions thereof, the tool being provided with clamping jaws in the area of the outer cone and being applied by its outer cone to the inner conical surface in form-locking manner, and in which spreading means are provided for spreading the clamping jaws in the radial direction.

This feature provides the advantage that, compared with the axial introduction of a pressing cone discussed before, only radial forces are exerted so that no shearing stress acts upon the frictional coating.

According to an alternative embodiment of a device according to the invention, in which the element is likewise provided with a sintered frictional coating having an inner conical surface and the tool is provided with an outer cone exhibiting the same angle of taper, at least over certain portions thereof, the tool is provided, in the area of the outer cone, with rollers which during rotation of the tool describe an outer cone adapting itself in form-locking manner to the shape of the inner conical surface, and spreading means are provided for pressing the rollers radially against the surface.

This feature provides the advantage that such a rolling tool enables high calibrating forces to be applied without the risk of any permanent deformation of the element, for example an expansion of the synchronizing ring. For, this feature ensures that the pressure is distributed over, for example, three rollers distributed over the circumference of the synchronizing ring, the pressure being, preferably, finely adjustable either by means of an axially displaceable inner cone or by a hydraulic piston arranged in a suitable manner. Further, this variant of the invention does without any form-locking holding means for the element, which may be required in the case of full-surface calibration if high pressures are to be applied in order to avoid the before-mentioned permanent deformations.

According to a third variant of the method according to the invention, the pressure is generated in the case of an inner conical surface by radial expansion of a tool which can be deformed radially and which exhibits an outer conical shape at least over certain portions thereof.

It is preferred for this purpose to use a device in which the element is provided with a sintered frictional coating having an inner conical surface and the tool exhibits an outer cone of the same angle of taper, at least over certain portions thereof, in which the tool is further provided, in the area of the outer cone, with deformable walls defining a cavity, and in which the outer cone of the tool is in form-locking contact with the inner conical surface, there being finally provided means for adjusting a pressure in the said cavity.

This embodiment of the invention, too, provides the advantage that only radial compacting forces are exerted. In addition, the compacting pressure can be adjusted particularly sensitively by dosing the pressure, for example by hydraulic means.

According to a fourth variant of the method according to the invention, the pressure is generated in the case of an outer conical surface by axial application of a tool exhibiting an inner conical shape at least over certain portions thereof.

Here again, it is preferred to use a device in which the element is provided with a sintered frictional coating having an outer conical surface and the tool exhibits an inner cone having the same angle of taper, at least over certain portions thereof, the element and the tool being axially displaceable relative to each other and arranged for being pressed together under pressure.

According to a fifth variant of the method according to the invention, the element is directly subjected to a fluid pressure.

This feature, which can be employed for closed-pore frictional coatings, provides the advantage that no special moving tools are required because only the element has to be exposed to a fluid pressure, for example an oil pressure in a pressure tank, or the like, and this can be effected by simple autoclaves.

According to a modification of this variant, which is suited for elements with open-pore frictional coatings, the frictional coating is initially sealed, whereafter the element is subjected directly to a fluid pressure.

Other advantages of the invention will be apparent from the following specification and the attached drawing. It it understood that the features that have been described before and which will be explained hereafter may be used not only in the described combination, but also in any other combination or individually, without leaving the scope of the present invention.

Certain embodiments of the invention will be described hereafter in greater detail with reference to the drawing in which.

Figure 1:
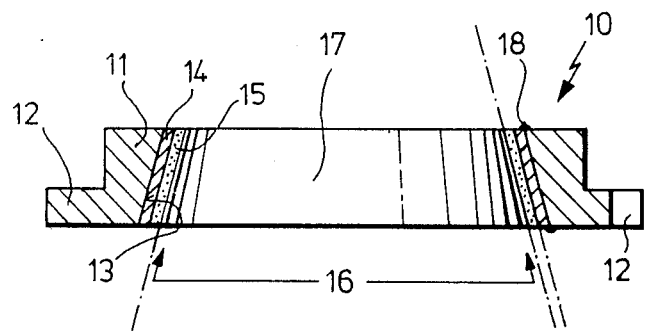
FIG. 1 shows a section through one embodiment of a frictional locking element produced by the method according to the invention, in the form of a synchronizing ring.

In FIG. 1, reference numeral 10 designates a synchronizing ring which will be used as an example of frictional locking elements for the purposes of the following specification. It is, however, understood that instead of using a synchronizing ring it would also be possible to use correcting rings, clutch bodies or other similar frictional locking elements and that the representations have been limited to the synchronizing ring only for the sake of clarity.

The synchronizing ring 10 comprises a metallic body 11 carrying a toothing 12 on its outer periphery. A frictional body consisting of a carrier plate 14 and a frictional coating 15 applied thereon is applied to an inner conical surface 13 of the metallic body 11.

The frictional body is produced by applying a granular frictional material capable of being sintered upon a large, plane carrier plate, and sintering this compound structure thereafter. After sintering, the flat carrier plate is cut into suitable lengths, which are then given the desired shape by deep-drawing, or the like, for example the hollow toroidal shape shown in FIG. 1, and are finally secured in place, for example by welding, as indicated by the welding seam 18 in FIG. 1.

If the synchronizing ring 10 is to be suited for use in a reliable manner, it is essential that the dimension of the inner cone indicated at 16 in FIG. 1 be observed, which defines the opening 17 of the synchronizing ring 10. The dimension 16 of the inner cone must conform, with the least possible tolerance, with nominal values, as regards the angle of taper and the diameter.

According to certain known methods, the frictional body consisting of the carrier plate 14 and the frictional coating 15 was compacted under pressure while in its plane, uncut condition, and the compacted frictional body was then formed and inserted into the metallic body 11.

Figure 2:
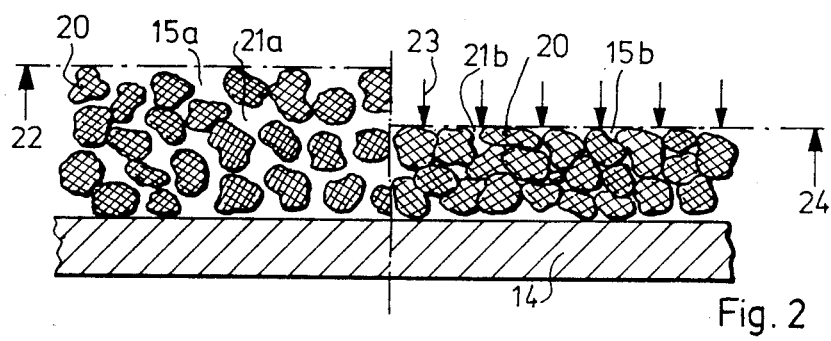
FIG. 2 shows a diagrammatic representation, in very enlarged scale, illustrating how a frictional coating is compacted.

In the left half of FIG. 2, a frictional coating can be seen in the condition following the sintering process. The structure of the grains 20 of the frictional material is relatively loose, with relatively large interspaces 21a. This condition defines a raw dimension 22 of the thickness of the frictional coating 15a and/or of the frictional coating 15a and the carrier plate 14.

Now, when a pressure 23 is exerted upon the surface of the frictional coating 15b, as illustrated in the right half of FIG. 2, the grains 20 are compacted and, in particular, the size of the interspaces 21a is reduced. Accordingly, a nominal dimension 24 smaller than the raw dimension 22 is obtained which can be adjusted within certain limits by varying the pressure 22. In proceeding in this manner one takes advantage of the fact that after sintering the frictional coating 15a exhibits a relatively ductile structure, which means that it can be compacted in this condition without being damaged.

Figure 3:
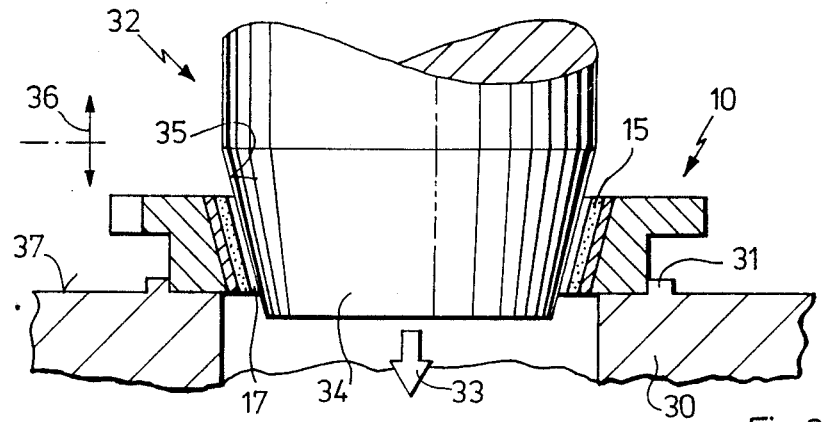
FIG. 3 shows a first embodiment of a device according to the invention for carrying out a first embodiment of a method according to the invention.

FIG. 3 shows a diagrammatic representation of a first device of the type suited for use in connection with the present invention.

A synchronizing ring 10 is arranged, with the wider opening 17 pointing upwards, on a workholder 30 comprising a centering stop 31. The centering stop 31 embraces the synchronizing ring 10 preferably in a form-locking manner in order to prevent any permanent deformation when high compacting forces are applied.

A tool 32 can be displaced downwardly, relative to the workholder 30, in the direction indicated by arrow 33. A tool 32 exhibits at its lower end an outer cone 34 whose angle of taper is identical to the angle of taper of the inner cone of the synchronizing ring 10 at the surface of the frictional coating 15.

When the tool 32 is moved downwardly in the direction indicated by arrow 33, from the position shown in FIG. 3 in which it is spaced from the synchronizing ring 10, the conical surface 35 of the large cone 34 gets into contact with the surface of the frictional coating 15. By adjusting the vertical position 36 relative to the contact surface 37 of the workholder 30 it is now possible to compact the frictional coating 15 with high precision to the nominal dimension 24 indicated in FIG. 2. It is thus possible to adjust the dimension 16 of the cone indicated in FIG. 1 on the finished synchronizing ring 10 with extremely small tolerances.

Figure 4:
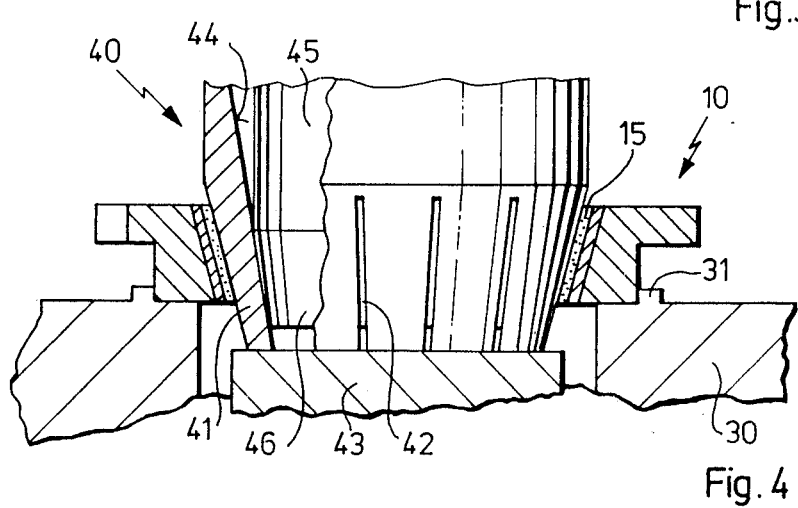
FIG. 4 shows a representation similar to that of FIG. 3, illustrating a second variant of embodiments according to the invention.

In the case of the second embodiment shown in FIG. 4, the synchronizing ring 10 is clamped in the same manner as explained in connection with FIG. 3. A tool 40 is provided on its lower conical end with clamping jaws 41 separated from each other by axial slots 42. Unlike the arrangement of the embodiment shown in FIG. 3, the tool 40 as shown in FIG. 4 is fixed in the axial direction, resting by its lower end face on a stationary stop 43 so that the surfaces of the clamping jaws 41 engage the surface of the frictional coating 15 in a form-locking manner.

The tool 40 is provided with an axial inner bore ending at the bottom in an inner cone 44. Now, the clamping jaws 41 can be moved radially outwardly by means of an axially movable spreader bar 45 exhibiting at its lower end an outer cone 46 matching the inner cone 44, whereby the frictional coating 15 is compacted under the action of purely radial forces, i.e. without any shearing stress which may still be encountered in the embodiment according to FIG. 3.

Figure 5:
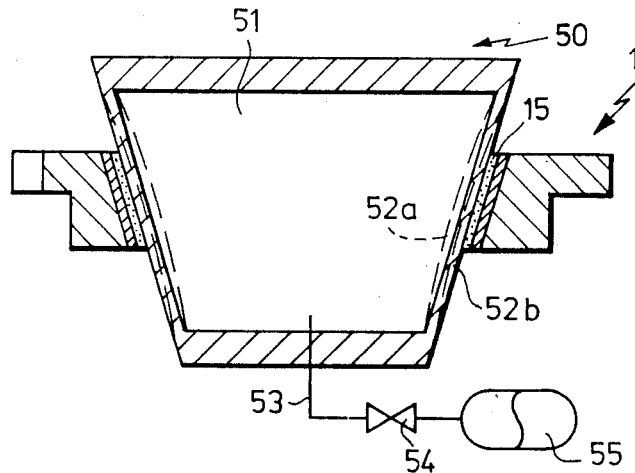
FIG. 5 shows another representation similar to that of FIG. 3, illustrating a third variant of embodiments according to the invention.

According to a third embodiment represented in FIG. 5, the synchronizing ring 10 is again seated in the described manner. An outer conical surface of a tool 50 is in fixed form-locking engagement with the frictional coating 15, as has been described already in connection with FIG. 4.

The tool 50 is provided with a cavity 51, and the side walls 52, which extend substantially along an outer conical contour, can be deformed by adjusting the pressure in the cavity 51. When low pressure or no pressure prevails in the cavity 51, the side walls are slightly retracted inwardly, as indicated by dashed lines at 52a. Now, when the pressure is increased in the cavity 51, the side walls 52 will deform outwardly until they assume their final position indicated by full lines at 52b, in which the frictional coating 15 has been compacted exactly to the nominal dimension.

For generating pressure in the cavity 51, a pressure, for example a hydraulic or pneumatic pressure, may be supplied from a pressure reservoir 55, via a line 53 and a valve 54.

Figure 6:
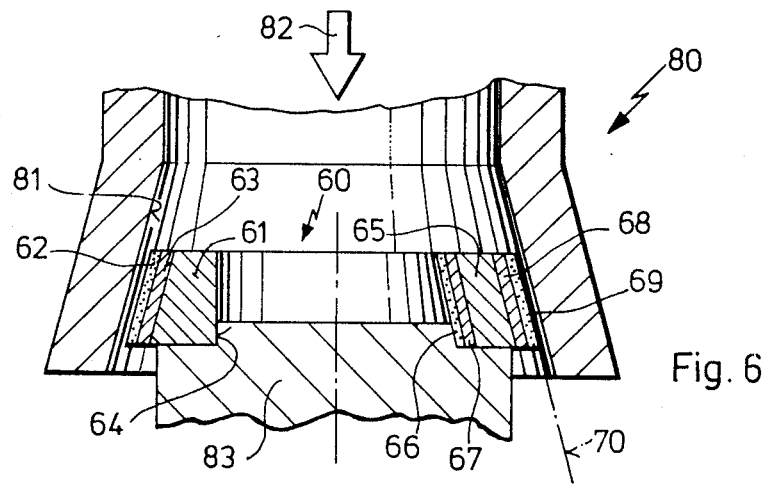
FIG. 6 shows another representation similar to that of FIG. 3, illustrating a fourth variant of embodiments according to the invention.

FIG. 6 shows a fourth embodiment according to the invention, where a synchronizing ring 60 having an outer conical surface is being processed.

The left half of FIG. 6 shows a variant in which the synchronizing ring 60 comprises a metallic body 61 which is provided on its outer conical surface with a frictional body consisting of a frictional coating 62 and a carrier plate 63. An inner surface 64 of the metallic body 61 exhibits a conical and axially cylindrical shape.

Contrary to this, the right half of FIG. 6 shows another variant where the metallic body 65 of the synchronizing ring 10 exhibits a conical shape and is provided with frictional bodies both on its inside and on its outside. The inner frictional body consists again of a frictional coating 66 and a carrier plate 67, while the outer frictional body consists of a carrier plate 68 and a frictional coating 69.

A tool 80 is provided with an inner bore and has its lower end expanded outwardly so as to form an inner cone 81 whose angle of taper conforms with the outer cone of the synchronizing ring 60. Now, when the tool 80 is moved downwardly in the direction indicated by arrow 82, the frictional coating 62 or 69 of the synchronizing ring 60, which is clamped on a workholder 83, in centered relationship, is compacted in the manner generally explained already in connection with FIG. 3.

Figure 7:
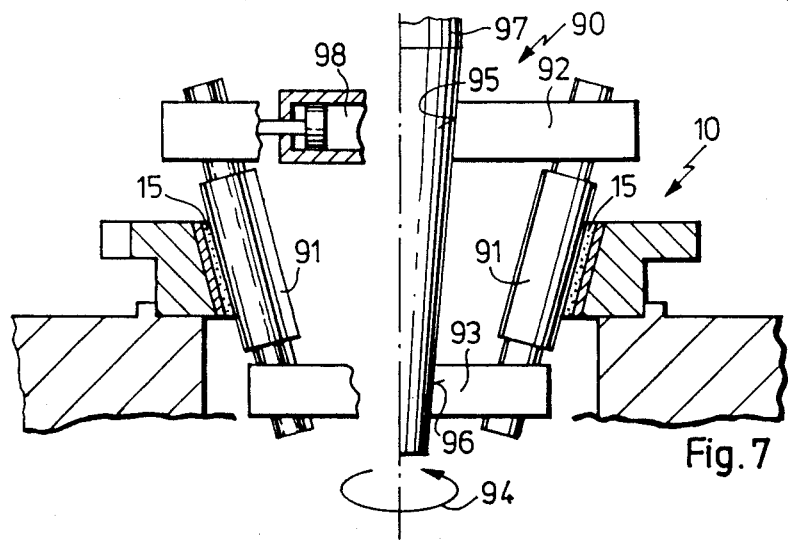
FIG. 7 shows another representation similar to that of FIG. 3, illustrating a fifth variant of embodiments according to the invention.

FIG. 7 shows another embodiment of the invention where a rolling tool 90 is used for compacting the frictional coating 15.

The rolling tool 90 comprises fixed or rotating rollers 91 provided with a particularly hard surface, for example a diamond surface, or the like. The ends of the rollers 91 are seated in frames 92, 93, the latter being arranged to rotate jointly about the vertical axis of the synchronizing ring 10, in the direction indicated by arrow 94. The setting angle of the rollers 61 is selected in such a manner that during rotation of the rolling tool 90 in the direction indicated by arrow 94, the surfaces of the rollers 91 describe exactly an outer cone adapting itself in a form-locking manner to the inner conical surface of the frictional coating 15.

Although the rolling tool can also be introduced into the synchronizing ring in the axial direction, as explained generally with reference to FIG. 3, one embodiment is particularly preferred where the frames 92, 93 are spread radially. For this purpose, the frames 92, 93 may be provided with inner conical surfaces 95 engaged in a form-locking manner by an outer conical surface 96 of a spreading cone 97 which when moved in the axial direction acts to press the rollers 91 against the frictional coating 15 in a substantially radial direction.

Alternatively, hydraulic means may be provided also for spreading the frames 92, 93 in the radial direction, for example a piston/cylinder unit 98 of the type shown very diagrammatically in the left half of FIG. 7.

Figure 8:
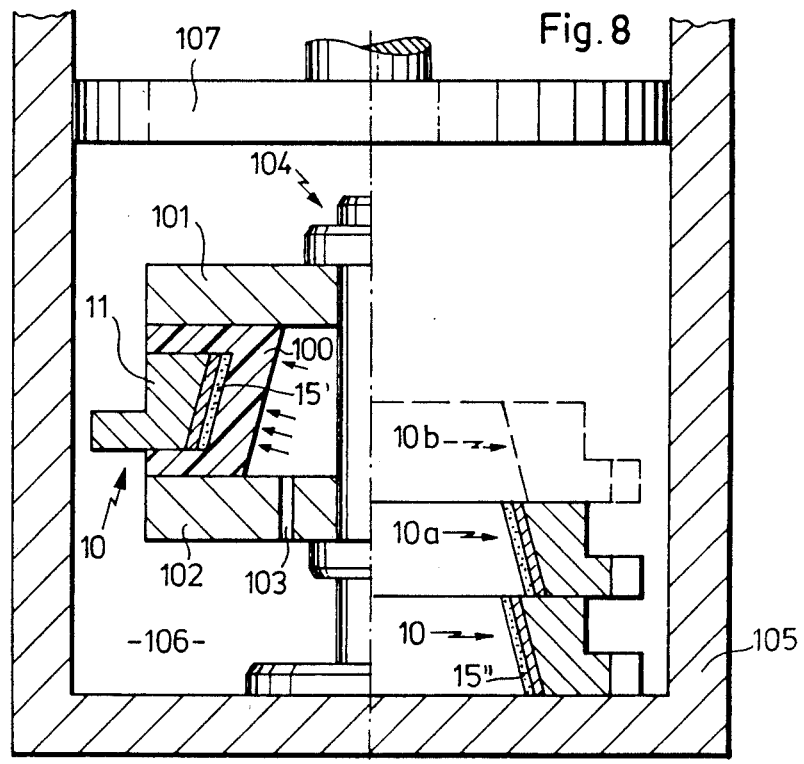
FIG. 8 shows a partly sectional view illustrating a sixth variant of embodiments according to the invention.

Finally, FIG. 8 shows still other embodiments of the invention where the synchronizing ring 10 is subjected directly to a fluid pressure.

The left half of FIG. 8 represents the case where the frictional coating 15' exhibits an open-pore structure. In order to seal this open-pore structure, the frictional coating 15' is surrounded by an elastic sealing body 100 which embraces, by way of example, also part of the metallic body 11.

The elastic sealing body 10 is held on both sides, in the axial direction, by pressure plates 101, 102, at least one of them being provided with an equalizing bore 103. The pressure plates 101, 102 in turn are fixed to a stand 104, it being also possible, for example, to screw the pressure plates 101, 102 to each other.

The stand 104 is arranged in a pressure tank 105, and the inner space 106 of the said pressure tank 105 can be subjected, by a piston 107 indicated only diagrammatically, to a pressure that can be adjusted within very wide limits. For this purpose, the inner space 106 is filled conveniently with a pressure fluid although it is also possible to compress the air present in the inner space 106 by means of the piston 107, provided this pressure will be sufficient under the circumstances of the particular case. The pressure is adjusted in the range of between 150 and 600 bar, preferably between 230 and 460 bar.

Due to the equalizing bore 103, the pressure is distributed evenly inside the inner space 106 and acts to urge the elastic sealing body 100 against the open-bore frictional coating 15', as indicated by arrows, so that the frictional coating 15' is compacted uniformly.

The right half of FIG. 1 contemplates the case where the frictional coating 15" is of the closed-pore type so that no separate sealing is required. In this case, the synchronizing ring 10 and the frictional coating 15" can be subjected directly to the fluid pressure, and the apparatus elements shown in the left half of FIG. 8 do not serve any useful purpose. It is also possible in this case to stack several synchronizing rings loosely one on top of the other, as indicated at 10, 10a, 10b in FIG. 8.

In the case of the embodiment shown in FIG. 6, an outer conical workpiece was worked with an inner conical tool designed analogously to the outer conical tool of FIG. 3. However, it is understood that it is also possible to work an outer cone with inner conical tools designed analogously to the outer conical tools of FIGS. 4, 5, 7 and 8.

What is claimed:

1. A method for manufacturing frictional synchronizing rings for stepped motor vehicle transmissions, comprising the steps of:
    manufacturing a ring-shaped metallic base member having a rotational axis and a first conical surface thereabout;
    depositing a frictional layer of a predetermined first thickness on said first conical surface, said layer being made of a sintering powder;
    sintering said layer on said first conical surface;
    providing a tool having a second conical surface complementary to said first conical surface;
    applying said tool with said second conical surface on said first conical surface; and
    pressing said tool against said base member to calibrate said sintered frictional layer to a predetermined second thickness less than said first thickness.
2. The method of claim 1, wherein said first conical surface is an inner conical surface on the base member and said second conical surface is an outer conical surface on the tool.
3. The method of claim 1, wherein said first conical surface is an inner conical surface on the base member and said second conical surface is an outer conical surface on the tool, and said pressing step comprises moving the tool into said base member along said rotational axis in a manner to effect pressing of said outer conical surface against the frictional layer on said inner conical surface.
4. The method of claim 1, wherein said first conical surface is an inner conical surface on the base member and said second conical surface is an outer conical surface on the tool, and said pressing step comprises introducing said tool into said base member along said rotational axis until said second conical surface abuts said first conical surface, and then effecting radial deformation to press same against said base member in a direction perpendicular to said rotational axis.
5. The method of claim 4, wherein said step of effecting radial deformation comprises radially spreading displaceable segments of said second conical surface.
6. The method of claim 1, wherein said first conical surface is an outer conical surface on the base member and said second conical surface is an inner conical surface on the tool.
7. The method of claim 1, wherein said first conical surface is an outer conical surface on the base member and said second conical surface is an inner conical surface on the tool, and said pressing step comprises passing the tool over said base member along said rotational axis and then pressing the tool against said base member along said rotational axis.
8. A method for manufacturing frictional synchronizing rings for stepped motor vehicle transmissions, comprising the steps of:
    manufacturing a ring-shaped metallic base member having a rotational axis and a first conical surface thereabout;
    depositing a frictional layer of a predetermined first thickness on said first conical surface, said layer being made of a sintering powder;
    sintering said layer on said first conical surface; and
    subjecting said base member with said layer thereon to a fluid pressure exerted in a manner to calibrate said layer to a decreased thickness.
9. The method of claim 16, wherein said sintered layer is made of an open-pore structure and said subjecting step comprises first sealing said layer and then exposing same directly to the fluid pressure.

* * * * *